United States Patent
Fenton

[15] 3,668,249
[45] June 6, 1972

[54] CYCLIC HYDROCARBOXYLATION PROCESS FOR PRODUCTION OF STRAIGHT-CHAIN ACIDS, ANHYDRIDES OR ESTERS

[72] Inventor: Donald M. Fenton, Anaheim, Calif.
[73] Assignee: Union Oil Company of California, Los Angeles, Calif.
[22] Filed: June 10, 1969
[21] Appl. No.: 831,982

[52] U.S. Cl. ........................ 260/546, 260/398, 260/410.9, 260/413, 260/468 CB, 260/476 R, 260/497 A, 260/514 C, 260/515 R, 260/533 A
[51] Int. Cl. .............. C07c 51/14, C07c 51/56, C07c 67/00
[58] Field of Search ................ 260/545, 544, 497, 486, 408, 260/514, 533

[56] References Cited

UNITED STATES PATENTS 3,437,676  4/1969  Kutepow ........................ 260/468

OTHER PUBLICATIONS

Tsuji and Ohno, J. Am. Chem. Soc. 90 94– 107, 1968.
Gould, Mech. and Structure in Org. Chem., 171– 172, 1959.

*Primary Examiner*—Lorraine A. Weinberger
*Assistant Examiner*—Robert Gerstl
*Attorney*—Milton W. Lee, Richard C. Hartman, Lannas S. Henderson, Dean Sandford, Robert E. Strauss and Michael H. Laird

[57] ABSTRACT

A process for preparation of straight-chain acids, anhydrides or esters, comprising contacting an ethylenically unsaturated hydrocarbon, carbon monoxide and water, a carboxylic acid or an alcohol at specified temperatures with a group VIII noble metal catalyst, separating the straight-chain product and recycling the branched-chain product to the reaction medium.

8 Claims, No Drawings

CYCLIC HYDROCARBOXYLATION PROCESS FOR PRODUCTION OF STRAIGHT-CHAIN ACIDS, ANHYDRIDES OR ESTERS

DESCRIPTION OF THE INVENTION

The invention relates to a method of producing acids, anhydrides or esters. More particularly, the invention relates to a method for controlling the distribution of the products between straight-chain and branched-chain isomers.

It is known in the art that an ethylenically unsaturated hydrocarbon, carbon monoxide and water, a carboxylic acid or an alcohol can be contacted with a group VIII noble metal catalyst to produce a carboxylic acid, anhydride or an ester respectively. The products of the above hydrocarboxylation reactions are a mixture of the straight-chain and branched-chain products. A disadvantage of these prior art processes is that the proportion of straight-chain to branched-chain product cannot be readily controlled.

It is an object of this invention to provide a method of controlling the isomer distribution of the products of a hydrocarboxylation reaction.

It is also an object to provide an improvement in said reaction for increasing the yield of the straight-chain product.

It is an alternative object to provide an improvement in said reaction for increasing the yield of the branched-chain product.

Other objects of the invention will be apparent from the following description.

It is my discovery that the above hydrocarboxylation reactions are reversible and that the yield of the desired product, e.g., straight-chain acid, may be increased by recycling the undesired product, e.g., branched-chain acid, to the reaction medium. The reactions proceed according to the following exemplary equations:

|   |   |   | Straight-chain | Branched-chain |
|---|---|---|---|---|
| 1 | $CR_2=CH_2+CO+H_2O$ | ⇌ | $CR_2HCH_2COOH$ | Plus $CR_2CH_3COOH$ |
| 2 | $CR_2=CH_2+CO+RCOOH$ | ⇌ | $CR_2HCH_2COOCOR$ | Plus $CR_2CH_3COOCOR$ |
| 3 | $CR_2=CH_2+CO+ROH$ | ⇌ | $CR_2HCH_2COOR$ | Plus $CR_2CH_3COOR$ |

My discovery that the above hydrocarboxylation reactions are reversible ranges can be advantageously utilized by the employment of a cyclic process. In the case where the straight-chain product is desired, the branched-chain product can be separated from the reaction product mixture and recycled to the reaction medium. Recycling the undesired product increases the amount of branched-chain product in the reaction medium and suppresses formation of the branched-chain product. In an alternate scheme wherein a branched-chain product is desired, the straight-chain product of the hydrocarboxylation reaction is separated and recycled to the reaction medium.

The ethylenically unsaturated hydrocarbon that can be reacted has two to about 25 carbons, preferably two to about 12 carbons and has a double bond in the alpha, i.e.,

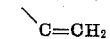

or beta position, i.e.,

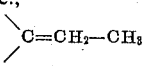

according to the following structure:

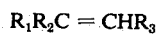

wherein $R_1$ and $R_2$ are hydrogen or the same or different hydrocarbon consisting of alkyl, monocyclic cycloalkyl and/or monocyclic aryl as defined in "The Handbook of Chemistry and Physics," 46th Edition by Weast, and wherein $R_3$ is methyl or hydrogen.

Preferably $R_1$ and $R_2$ are alkyl or hydrogen, i.e., an olefin, and preferably $R_3$ is hydrogen. Examples of useful ethylenically unsaturated hydrocarbons are ethylene, propylene, butene-1, butene-2, 3-ethylhexene-1, 2-methylhexene-1, decene-1, 3,3-dimethyl nonene-1, dodecene-1, undecene-2, 6-propyldecene-1, hexadecene-1 4-ethyltridecene-1, octadecene-1, 5,5-dipropyldodecene-2, styrene, 6-phenylhexene-1, 1,3-diphenylbutene-1, 3-benzylheptene-2, 3-cycloheptyl-5-phenyldodecene-1, etc. Of the preceding the alpha aliphatic olefins having two to about 18 carbons, preferably two to eight carbons, are preferred, e.g., ethylene, propylene, butylene-1, pentene-1, hexene-1, heptene-1, octene-1, decene-1, etc.

The reactant carboxylic acid in equation (2) hereinabove has two to 25 carbons, preferably two to 18 carbons and the general formula:

wherein R is hydrogen or a hydrocarbon consisting of alkyl, monocyclic cycloalkyl and/or monocyclic aryl, preferably alkyl.

Examples of useful acids are acetic, propionic, n-butyric, isobutyric, pivalic, n-valeric, n-caproic, caprylic, capric, decanoic, myristic, palmitic, stearic, benzoic, phthalic, terephthalic, toluic, 3-phenylhexanoic, 2-xylylpalmitic, 3-cyclobutyl-2-ethyllauric, and 4-phenyl-5-isobutylstearic. Examples of the preferred alkanoic acids or fatty acids are acetic, propionic, n-butyric, isobutyric, pivalic, caproic, undecyclic, etc.

The reactant alcohol in the above equation (3) may be in general any alcohol having one to 25 carbons, preferably one to 18 carbons, and having the formula:

wherein R is a hydrocarbon consisting of alkyl, monocyclic cycloalkyl and/or monocyclic aryl; preferably alkyl.

Examples of suitable alcohols include methanol, ethanol, isopropanol, propanol, butanol, tertiary butanol, pentanol, hexanol, 2-ethylhexanol, octanol, decanol, 6-pentadecanol, cyclopentanol, methylcyclopentanol, cyclohexanol, benzyl alcohol, α-ethylphenethyl alcohol, 3-phenylhexanol, 4-tolyldecanol, 2-cyclohexyloctanol, etc.

The terms "straight-chain" and "branched-chain" used herein refer to products wherein the alpha or the beta carbon respectively of the ethylenically unsaturated hydrocarbon becomes covalently bonded to the carbon of the carbonyl group, i.e., $CR_2HCH_2COOH$ is "straight-chain" and $CR_2CH_3COOH$ is "branched-chain." When the reactant ethylenically unsaturated hydrocarbon has the double bond in the beta position, it is believed that a branched-chain product is initially formed, however, the product decomposes in situ to form a hydrocarbon having the double bond in the alpha position which then reacts forming a straight-chain product.

The catalyst of the invention comprises a group VIII noble metal in complex association with a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about three carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

wherein E is trivalent phosphorus, arsenic, antimony or bismuth; and wherein R is the same or different alkyl having one to about 10 carbons, cycloalkyl having four to about 10 carbons, or aryl group having six to about 10 carbons, examples of which are methyl, butyl, nonyl, cyclohexyl, cyclodecyl, phenyl, tolyl, xylyl, duryl, etc. Preferably at least one R is aryl, e.g., phenyl, tolyl, xylyl, etc. and, most preferably, the ligand is triaryl.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)-phosphine, ethyldiphenylphosphine, phenylditolylphosphine, phenyldiisopropylphosphine, phenyldiamylphosphine, xylyldiphenylarsine, tolyldi(m-xylyl)stibine, trixylylphosphine, trixylylarsine, trixylylstibine, cyclopentyldixylylstibine, dioctylphenylphosphine, tridurylphosphine, tricumenylphosphine, trixylylbismuthine, etc. Of the aforementioned, the aryl phosphines and particularly the triarylphosphines (e.g., triphenylphosphine) are preferred because of their greater activity.

The group VIII noble metal may be ruthenium, rhodium, palladium, osmium, iridium or platinum and is preferably palladium due to its greater activity. A catalytic quantity of the metal is added (e.g., 0.002–2 percent of the reaction medium) and the metal may be added as a soluble salt, a carbonyl, a hydride or as a chelate.

The group VIII noble metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300 percent of that stoichiometrically required to form a complex with the group VIII metal). The complex has from 1 to about 5 moles of biphyllic ligand per atom of the metal and other components such as hydride, or soluble anions such as sulfate, nitrate, $C_1$-$C_5$ carboxylates (e.g., acetate, propionate, isobutyrate, valerate, etc.), halide, etc. may be but need not be included in the complex catalyst of this invention. These components may be incorporated in the catalyst by the formation of the catalyst complex from a group VIII noble metal salt of the indicated anions. A preferred complex is one comprising at least one halide ligand, e.g., chloride, iodide or bromide, or at least one $C_1$-$C_5$ carboxylate, e.g., acetate, propionate, butyrate, etc., since these groups, particularly halide, have been shown to improve the activity of the catalyst.

Examples of suitable sources of the noble metals are as follows: iridium carbonyl chloride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloro(ethylene)platinate(II), chloropentaamminorhodium(III)chloride, rhodium dicarbonyl chloride dimer, rhodium nitrate, rhodium trichloride, rhodium carbonyl hydride, ruthenium trichloride, tetraammineruthenium hydroxychloro chloride; etc. Generally the halide salt and particularly the chloride salt are preferred sources of the group VIII noble metal (e.g., palladium chloride, rhodium chloride, etc.) It is preferred that the source of the group VIII noble metal be one wherein the anion to metal ratio is 2 or less, e.g., palladium chloride, rhodium nitrate, platinous iodide, etc.

The reaction is performed under liquid phase conditions and can be conducted in the presence of a suitable organic liquid which is inert to the reactants, products, catalyst under the reaction conditions and which, preferably, is a solvent for the reactants and catalyst.

The choice of the particular liquid depends of course on which one of the above three carbonylation processes is employed.

For production of carboxylic acids suitable reaction mediums include hydrocarbons, ketones, ethers, carboxylic acids and esters, etc. Examples of such mediums are hexane, heptane, benzene, toluene, acetic acid, benzoic acid, toluic acid, phthalic acid, methylethyl ketone, diethyl ketone, diisopropyl ketone, ethyl n-butyl ketone, methyl n-amyl ketone, cyclohexanone, di-iso-butyl ketone, di-iso-propyl ether, di-n-butyl ether, ethylene glycol di-iso-butyl ether, methyl o-tolyl ether, ethylene glycol di-butyl ether, di-iso-amyl ether, methyl p-tolyl ether, methyl m-tolyl ether, di-iso-amyl ether and methyl benzoate, etc.

For ester production, suitable mediums include hydrocarbons, ketones, and ethers.

For anhydride production, suitable mediums include hydrocarbons, ketones, ethers and aromatic carboxylic acids and an anhydride of any of the acids described hereinabove, e.g., acetic anhydride, nonanoic anhydride and benzoic anhydride, etc.

The reaction can also be conducted in the absence of the above liquids by performing the reaction in an excess (2–100 times that stoichiometrically required) of the reactant hydrocarbon and/or water, acid, or alcohol. This can be accomplished for example in the "batch" process by terminating the reaction prior to most of the reactant being consumed or for example in the continuous process by adding sufficient hydrocarbon, acid, alcohol or water to maintain the desired excess.

In one embodiment for production of straight-chain products, the reaction is conducted in the presence of hydrogen. This can be achieved by supplying hydrogen, as a gas or in the form of hydrogen-forming agents, such as sodium boro hydride, lithium aluminum hydride, lithium hydride, hydrazine, etc., to the reaction zone to provide a pressure of hydrogen therein from about 1 to 60 atmospheres, preferably 1 to 30 atmospheres. In some applications wherein high conversion is desired lower hydrogen pressures are preferred and hence hydrogen pressures from 1 to about 13 atmospheres, preferably 1 to about 8 atmospheres, are also contemplated.

In another embodiment for production of straight-chain product, the reaction is performed in the absence or in the presence of only limited amounts of a strong mineral acid. The molar amount of such acid in the reaction medium should be maintained at less than 0.5 and preferably less than 0.05 times the molar amount of the group VIII noble metal. The acid concentration can be controlled below the aforementioned limits by judicious selection of the catalyst components added to the reaction zone or by the addition of an acid acceptor, to be described hereinafter. In a preferred embodiment, the reaction is performed in the presence of hydrogen and in the aforementioned limited amount of mineral acid.

To aid in controlling the acid concentration, I prefer to perform the reaction in the presence of an acid acceptor which reduces the concentration of reactive acid in the reaction medium. An acid acceptor is defined herein as a substance which will decrease the content of, or inhibit the formation of, hydrogen ion in the reaction medium (i.e., a compound in a solution to which strong acids may be added without substantially lowering the pH of the solution). Suitable acid acceptors or buffers include the alkali metal carboxylates, e.g., lithium acetate, sodium propionate, cesium butyrate, potassium acetate, cesium 2-ethylhexanoate, etc. and, in general, any carboxylate of a fatty acid having one to 20 carbons, preferably two to 15 carbons, e.g., acetate, propionate, isobutyrate, n-butyrate and valerate. Also alkali or alkaline earth metal salt of an inorganic oxo, polyfunctional acid such as carbonic, arsenous, arsenic or boric acids are suitable acid acceptors. Specific examples of these are cesium carbonate, potassium bicarbonate, barium carbonate, calcium carbonate, calcium arsenate, sodium arsenate, potassium borate, lithium arsenate.

The aforementioned acid acceptors, when employed, can be used in concentrations from about 0.01 to 5 weight percent, preferably 0.5 to 2 percent of the reaction medium, in amounts sufficient to lower the acid concentration to below the aforementioned maximum levels. Preferably, the amount of acid acceptor is insufficient to replace all of the preferred halide ligand since in such a case the activity of the catalyst decreases, which results in poor conversion of the reactants. Preferably, therefore, enough acid acceptor such as a $C_1$–$C_5$ carboxylate, is added to replace all but one halide but insufficient to replace all the halide ligand. The acid acceptors may be incorporated in the reaction medium as solutions or as slurries. The acid acceptors that have limited solubility in the reaction medium may be added as finely divided solids with a particle size from about 0.001 to about 0.5 inch average particle diameter to insure a sufficient surface area for adequate contacting with the reaction medium and adsorption of the acid during the reaction. The acid acceptors are particularly advantageous when carboxylic acids are the solvent and/or the product of the reaction.

In still another embodiment for production of straight-chain products, the reaction is performed in a limited amount of anion equivalent. Preferably, the reaction is conducted in the presence of hydrogen. The molar amount of anion equivalent (including that in complex with the group VIII noble metal) should be maintained from 0.1 to 2.0, preferably from 0.5 to 1.5 times the molar amount of group VIII noble metal. Generally the anion equivalent, e.g., chloride, is supplied with the source of group VIII noble metal, e.g., palladium chloride. In such a case the ratio of anion equivalent to palladium may be 2.0, however, the ratio may be decreased if desired by addition of hydrogen which reacts with chloride to form hydrogen chloride which may then be removed from the reaction medium in conventional manner, e.g., ion exchange and/or precipitation means. In general, the amount of anion equivalent may be increased by adding an appropriate salt, e.g., lithium chloride or decreased by known ion exchange and/or precipitation methods, e.g., ion exchanging hydroxyl for chloride, and/or adding silver nitrate to precipitate chloride.

The most preferred mode of practice comprises conducting the carbonylation in the presence of hydrogen and in the presence of an acid acceptor since, as previously mentioned, each encourage the formation of the straight-chain product. Hence, a preferred carbonylation comprises contacting an ethylenically unsaturated hydrocarbon, carbon monoxide and water, an alcohol or an alcohol or an anhydride with a complex catalyst comprising a group VIII noble metal and a biphyllic ligand in a hydrogen atmosphere, e.g., 1 to 30 atmospheres, in the presence of an acid acceptor such as an alkali or alkaline earth metal salt of a fatty acid. In an even more preferred embodiment, the reaction is conducted in a hydrogen atmosphere and in a limited amount of mineral acid and anion equivalent, accomplished, for example, by the addition of hydrogen gas, an acid acceptor and limitation of the concentration of the anion equivalent.

The reaction temperature significantly affects each of the above reactions. For reaction (1) wherein an acid is produced, the temperature should be between 175° and 250° C., preferably between 190° and 235° C. For reaction (2) wherein an anhdyride is produced, the temperature should be between 130° and 225° C., preferably between 140° and 200° C. In reaction (3) for ester production, the temperature should be between 200° and 250° C., preferably between 200° and 235° C.

The reaction can be performed at total pressures from 1 to 100 atmospheres absolute, preferably from 20 to 70 atmospheres, sufficient to maintain liquid phase conditions. The desired total pressure may be maintained by adding an inert gas, e.g., nitrogen, methane, etc., to the reaction medium. In most instances, the requisite pressure can be maintained by the carbon monoxide pressure and carbon monoxide pressures of 5 to 100 atmospheres, preferably 20 to 70 atmospheres can be used.

The reaction can be performed batchwise or in a continuous fashion. When operating batchwise, the liquid reactants, recycled product, catalyst, and reaction medium can be introduced into the reaction zone to form a liquid phase therein.

The reaction zone can be pressured with carbon monoxide and with the inert gas and/or hydrogen if desired. The reaction medium can then be heated to the desired reaction temperature. When the hydrocarbon reactant is a gas it of course can be separately added or can be added with the carbon monoxide. When performing the reaction in a continuous fashion the reaction medium including the reactants, recycled product, and catalyst can be charged to the reaction zone to form a liquid phase therein and the hydrocarbon, carbon monoxide and reactant water, acid or alcohol continuously introduced into the reaction zone to contact the reaction medium and the catalyst.

The gaseous reactants can be withdrawn as a separate effluent, cooled, depressured and the non-condensibles, chiefly carbon monoxide, recycled for further contacting. The liquid product can be withdrawn separately from the reaction zone by withdrawing a stream of the liquid reaction medium containing the products and recovering the desired straight-chain or branched-chain carboxylic acid, anhydride or ester therefrom by conventional processing such as distillation.

It is preferable to separate the total straight-chain and branched-chain product from the reaction medium, catalyst, and liquid reactants by conventional separation means such as single-stage or multiple-stage distillation. The straight-chain product can then be separated from the branched-chain product by distillation, solvent extraction, freezing, and/or clathration, (with urea for example) or other known techniques. The less-desired product may be recycled to the reaction zone. Preferably, a substantial amount, e.g., 30–100 percent, preferably 60–100 percent of the separated less-desired product is recycled to the reaction zone. The balance of the less-desired product, if any, is sent to product storage.

EXAMPLE 1

This example illustrates comparative results actually obtained first in the absence of the invention and second utilizing the discovery of the invention.

To a ½-gallon autoclave were added 1½ grams palladium chloride bis-triphenylphosphine, 6 grams triphenylphosphine, and 400 milliliters of acetic acid. The autoclave was purged with nitrogen and 76 grams of propylene were added. The autoclave was then further pressured with carbon monoxide until the absolute pressure was about 29 atmospheres. The reaction mixture was heated to and maintained at 150° C. for 3 hours while being continuously stirred. The heating was then discontinued, the autoclave was cooled and depressured, and the liquid contents were removed and hydrolyzed with water. The resulting liquid was analyzed to reveal that 28 grams of normal butyric acid and 17 grams of isobutyric acid had been formed. The ratio of straight-chain to branched-chain product was thus 1.65.

The above process was repeated except that 95 grams of isobutyric acid (the undesired branched-chain product) were added to the autoclave. The final hydrolyzed product was found to comprise 44 grams of normal butyric acid and 97 grams of isobutyric acid, including the initially added 95 grams of isobutyric acid. After subtraction of the initially added amount of isobutyric acid, the ratio of straight-chain to branched-chain product was 22.0, reflecting a substantial improvement over the 1.65 ratio in the above reaction wherein isobutyric acid was not added to the reaction medium.

EXAMPLE 2

This example illustrates a mode of practice contemplated for production of straight-chain or, alternately, branched-chain acids. All parts are on a weight basis.

To a stirred autoclave are added 2.0 parts palladium chloride bis-triphenylphosphine, 5.0 parts triphenylphosphine, 100 parts of water, 200 parts butene-1, 300 parts of heptane, and 100 parts of α-methylbutyric acid. The autoclave is purged with nitrogen and carbon monoxide is added until the pressure is 20 atmospheres absolute. The reaction mixture is heated to and maintained at about 190° C. for about 4 hours while being continuously stirred. The heating is then discontinued, the autoclave cooled and depressed and the liquid contents are removed. It can be observed that normal valeric acid is formed in substantially greater yields than when no α-methylbutyric acid is initially added to the autoclave.

When it is desired to increase the yield of α-methylbutyric acid instead of valeric acid, the 100 parts of α-methylbutyric acid added to the reaction medium in the above-illustrated example may be replaced by 100 parts of valeric acid.

200 parts of 3-benzyl-1-heptene-1, 100 parts of 4-benzyl-2-methylheptanoic acid and 2.0 parts of platinum acetate bis-triphenylphosphine, can readily be substituted for the 200 parts of butene-1, 100 parts of α-methylbutyric acid and 2.0 parts of palladium chloride bis-triphenylphosphine respectively without a substantial change to the illustrated mode of practice.

EXAMPLE 3

This example illustrates a mode of practice contemplated for production of straight-chain esters.

To a stirred autoclave may be added 15 parts palladium chloride, 6.0 parts of tritolylphosphine, 200 parts of 1-nonene, 200 parts of hexanol and 50 parts of hexyl α-methylnonanoate. The autoclave, after being purged with nitrogen, is pressured with carbon monoxide to about 25 atmospheres. The reaction mixture is heated to and maintained at 225° C. for about 2 hours. The heating is discontinued, the autoclave is cooled and depressured, and the liquid contents are removed and analyzed. It can be observed that a substantially greater yield of the straight-chain ester hexyldecanoate is formed than when no hexyl α-methylnonanoate is initially added to the autoclave.

EXAMPLE 4

This example illustrates another mode of practice contemplated wherein the undesired branched-chain product is continuously recycled to the hydrocarboxylation reaction zone.

To a reactor, may be added 2.0 parts of palladium chloride, 15.0 parts of triphenylphosphine, 300 parts of acetic acid and 150 parts of octene-1. The reactor is pressured with carbon monoxide to about 30 atmospheres and maintained at about 30 atmospheres by controlling the amount of carbon monoxide added to the reactor. The reactor is heated to and maintained at about 160° C. while being continuously stirred. About 50 parts per minute of acetic acid and 25 parts per minute of octene-1 are continuously fed to the reactor. A reaction mixture is removed from the reactor in amounts sufficient to maintain a constant liquid level in the reactor. The removed reaction mixture is fed to a separator where a portion of the catalyst complex is withdrawn from the bottom and, along with make-up palladium chloride and triphenylphosphine, recycled to the reaction medium. The remainder of the mixture is fed to a distillation column wherein a mixture of octene-1 and acetic acid is taken from the top of the column and, after being mixed with the make-up octene-1 and acetic acid, recycled to the reaction medium. A catalyst and anhydride mixture is taken from the bottom of the column and fed to a second distillation column wherein the branched-chain product anhydride is withdrawn from the top of the distillation column and recycled to the reaction medium. The straight-chain anhydride is removed from the middle of the column and sent to storage. A heel containing the catalyst is removed from the bottom of the column and recycled to the reaction medium.

I claim:

1. In the hydrocarboxylation reaction wherein an ethylenically unsaturated hydrocarbon having 2 to 25 carbons and having a double bond in the alpha or beta position, carbon monoxide and a reactant selected from the group consisting of water, a carboxylic acid having two to 25 carbons and an alcohol having one to 25 carbons are contacted under liquid phase reaction conditions with a palladium catalyst in complex association with a biphyllic ligand having the structure:

$$ER_3$$

wherein E is trivalent phosphorus, arsenic, antimony or bismuth; and wherein R is the same or different alkyl having one to about 10 carbons, cycloalkyl having four to about 10 carbons, or aryl having six to about 10 carbons;

at a temperature of 175° to 250° C. when water is selected as said reactant, 130° to 225° C. when said carboxylic acid is selected as said reactant, and 200° to 250° C. when said alcohol is selected as said reactant; the improvement of separating the straight-chain product from the branched-chain product and recycling one of the two said products to said contacting step to thereby increase the yield of the other of the two said products.

2. The process of claim 1 wherein the biphyllic ligand is a triarylphosphine whose aryl groups have six to 10 carbons.

3. The process of claim 2 wherein the branched-chain product is recycled to the reaction medium.

4. The process of claim 2 wherein the ethylenically unsaturated hydrocarbon is an alpha olefin having two to about 18 carbons.

5. The process of claim 2 wherein the hydrocarboxylation is conducted in a hydrogen pressure of 1 to 30 atmospheres.

6. The process of claim 2 wherein said hydrocarbon and carbon monoxide are reacted with a fatty acid having two to about 18 carbons.

7. The process of claim 6 wherein said ethylenically unsaturated hydrocarbon is an alpha olefin having two to about eight carbons, wherein said biphyllic ligand is triphenylphosphine, said temperature is 140° to 200° C. and the separated branched-chain anhydride is recycled to said reaction medium.

8. The process of claim 7 wherein said olefin is propylene, said acid is acetic acid and said temperature is about 150° C.

* * * * *